United States Patent [19]
Dillon

[11] 3,802,154
[45] Apr. 9, 1974

[54] MACHINE FOR GROUPING OBJECTS SUCH AS BOTTLES

[75] Inventor: Marcel Octave Dillon, Gergy, France

[73] Assignees: Pont-A-mousson S.A., Pont-A-Mousson; Societe Des Emballages Moules Sem, Montrouge, both of, France

[22] Filed: Jan. 30, 1973

[21] Appl. No.: 327,908

[30] Foreign Application Priority Data
Feb. 14, 1972 France .......................... 72.04810

[52] U.S. Cl. .................. 53/154, 53/159, 53/247, 53/251
[51] Int. Cl. .... B65b 35/36, B65b 35/52, B65b 5/08
[58] Field of Search ........ 53/26, 35, 156, 159, 164, 53/166, 168, 202, 247, 249, 250–252, 240, 154

[56] References Cited
UNITED STATES PATENTS

| | | | |
|---|---|---|---|
| 2,179,648 | 11/1939 | Thayer | 53/251 X |
| 2,907,159 | 10/1959 | Allen | 53/251 X |
| 3,037,645 | 6/1962 | Simpkins | 214/6 BA |

*Primary Examiner*—Robert L. Spruill
*Attorney, Agent, or Firm*—Sughrue, Rothwell, Mion, Zinn and Macpeak

[57] ABSTRACT

The machine comprises a tray filling station, two object-seizing stations, transfer devices movable between the seizing stations and the filling station and carrying object-seizing devices. Two conveyors respectively feed the objects to the two seizing stations. A tray feeding and transfer conveyor extends through the filling station and leads to a tray stacking station. The conveyors extend in directions different from the direction in which the transfer devices move.

9 Claims, 7 Drawing Figures

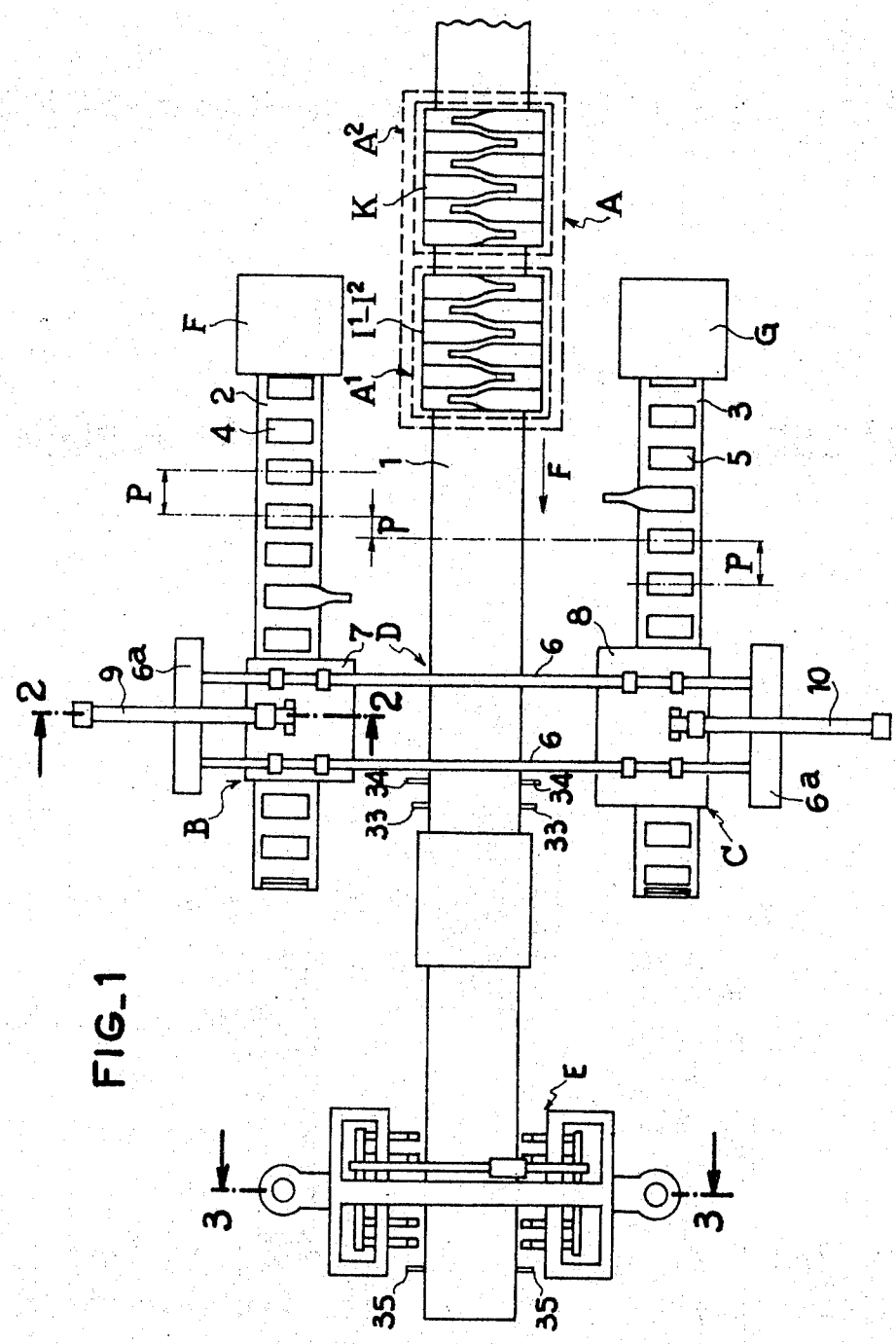
FIG_1

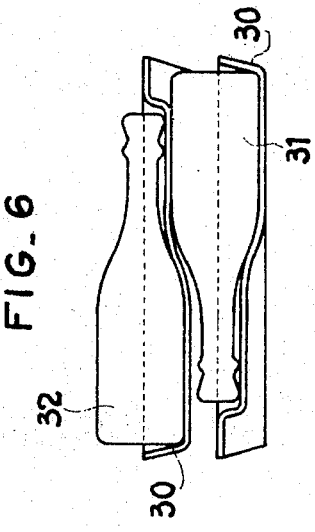
FIG._6
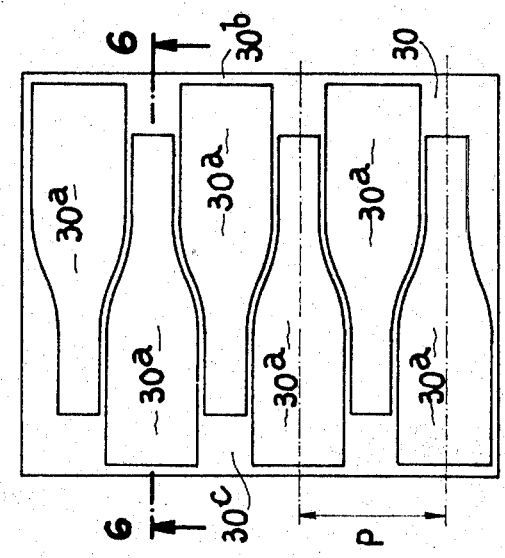
FIG._5
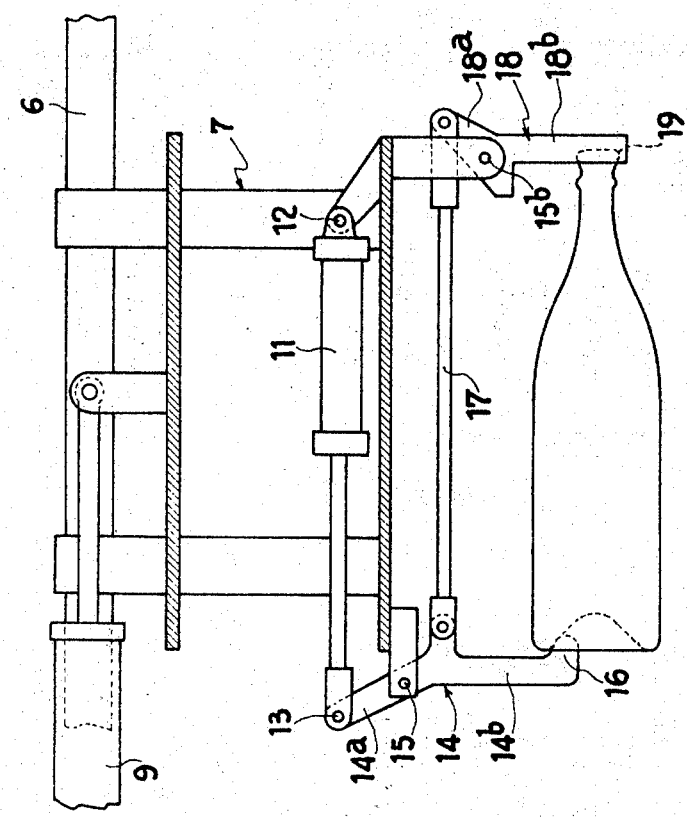
FIG._2

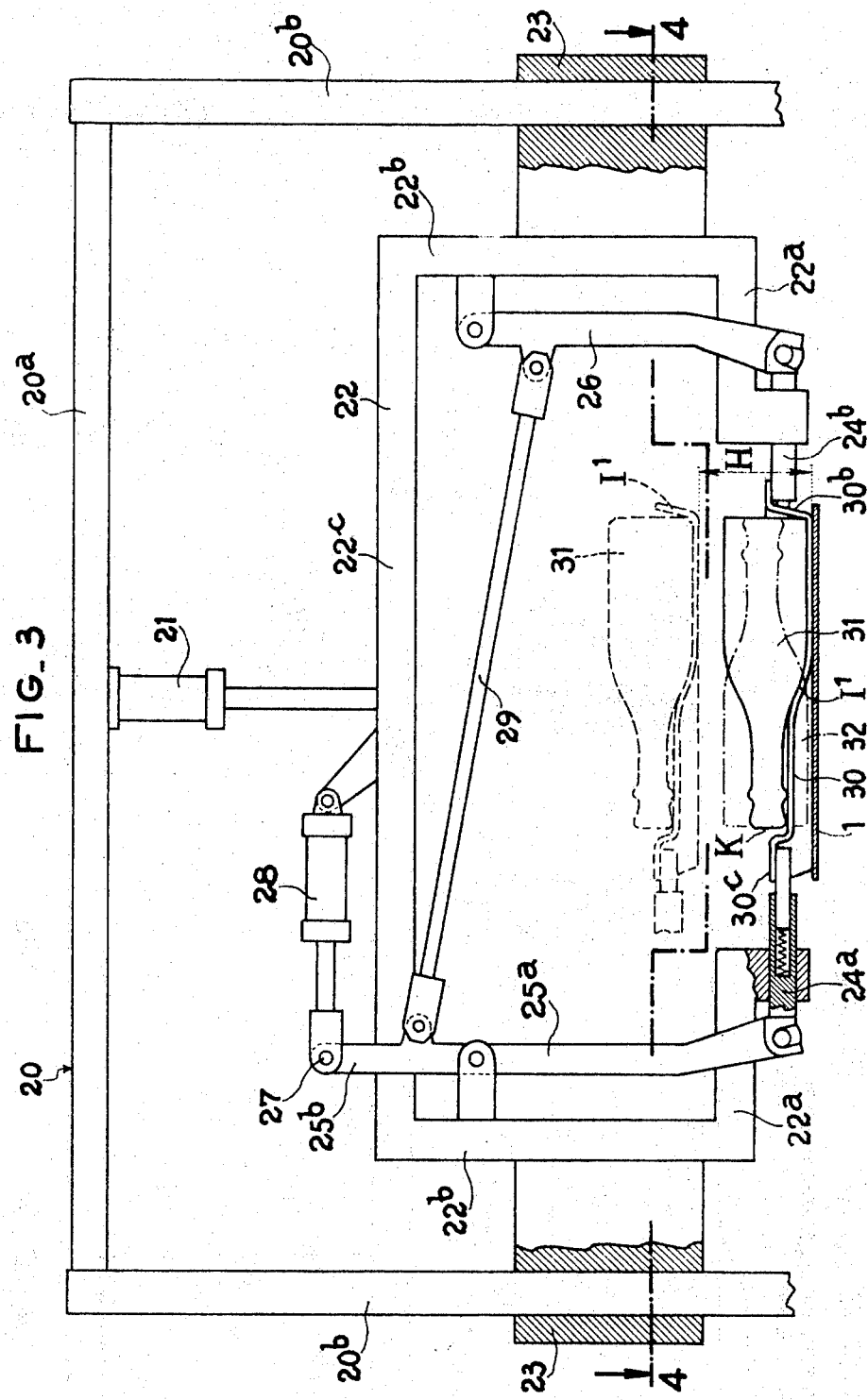

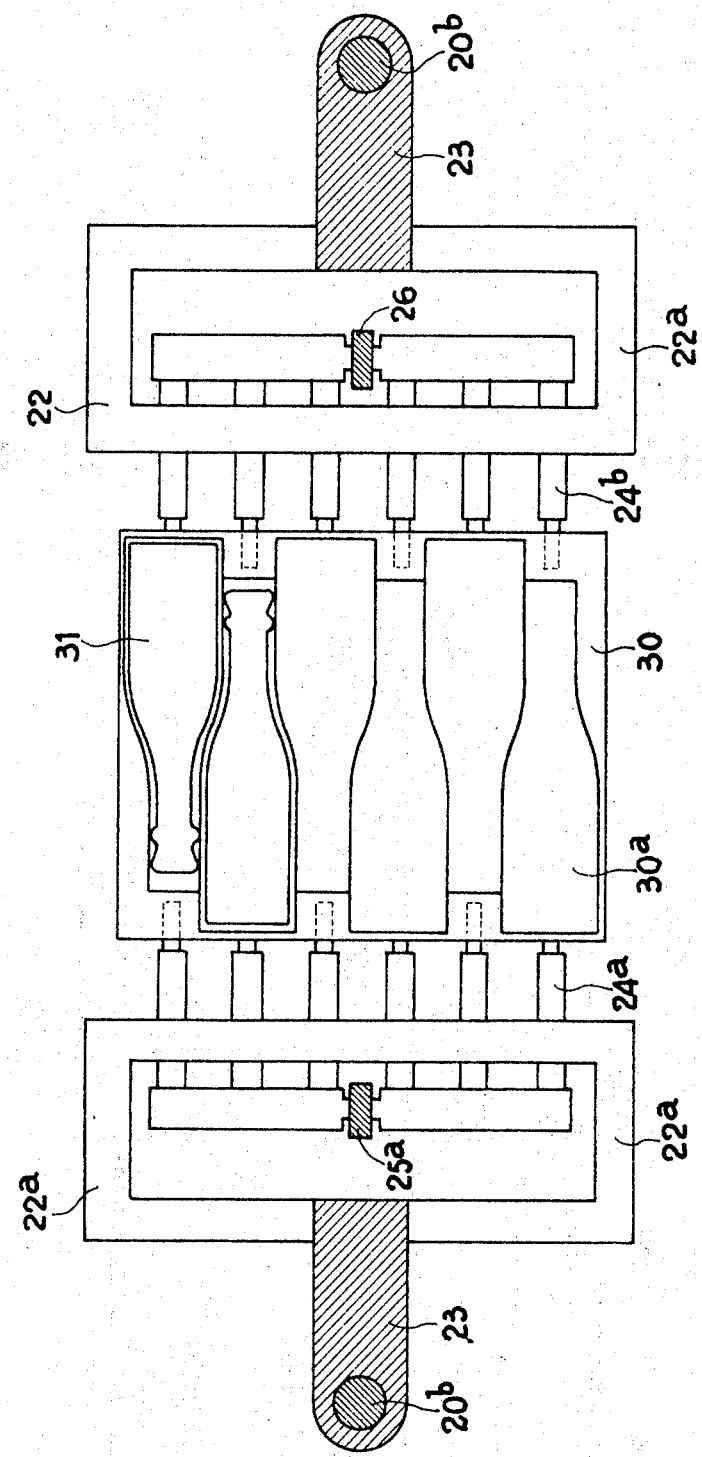

MACHINE FOR GROUPING OBJECTS SUCH AS BOTTLES

The present invention relates to a machine for grouping objects of elongate and dissymetrical shapes such as bottles. It concerns more particularly a machine whereby it is possible to achieve a stacking of said objects, a tray, moulded to have imprints of the objects, maintaining the objects unitary with each other in a common tier. The packet or group thus formed by the stacking of a plurality of trays loaded with objects has a roughly rectangular-sided contour and is intended to be placed in a case which is exactly rectangular-sided so as to facilitate transportation of the objects.

It is known to stack layers or tiers of objects of the aforementioned type, but up to the present time the objects were placed in position on the moulded trays and these loaded trays were stacked manually. The main difficulty in the construction of machines which carry out these operations mechanically, resides in the fact that in numerous utilisations of this type of grouping, the shape of the trays varies, that is to say, trays having the imprint of, for example, two, three, four, five or six objects are employed.

An object of the invention is to achieve the automatic loading and stacking of the trays.

According to the invention, the machine for grouping by loading the objects in head-to-toe relation on trays and then stacking a plurality of the loaded trays, comprises a tray filling station, two object-seizing stations, object-seizing devices carried by movable transfer devices between each of the seizing stations and the filling station, two conveyors for feeding the objects each of which leads to one of the seizing stations and devices in directions different from the direction of movement of the transfer devices and a tray supply and transfer conveyor which extends through the filling station in a direction also different from said direction of movement of the transfer devices and leads to a tray filling station.

Further features and advantages of the invention will be apparent from the ensuing description with reference to the accompanying drawings.

In the drawings:

FIG. 1 is a diagrammatic general plan view of a machine according to the invention;

FIG. 2 is a partial elevational view, taken on line 2—2 of FIG. 1, of one of the bottle seizing devices;

FIG. 3 is an elevational view of the machine, taken on line 3—3 of FIG. 1, showing the tray stacking station;

FIG. 4 is a diagrammatic top view of the stacking station taken on line 4—4 of FIG. 3;

FIG. 5 is a top plan view of a tray employed in the machine shown in FIGS. 1–4 for grouping bottles;

FIG. 6 is a diagrammatic elevational view, taken on line 6—6 of FIG. 5, of the stacking of two trays such as that shown in FIG. 5 loaded with bottles.

Figure 7:
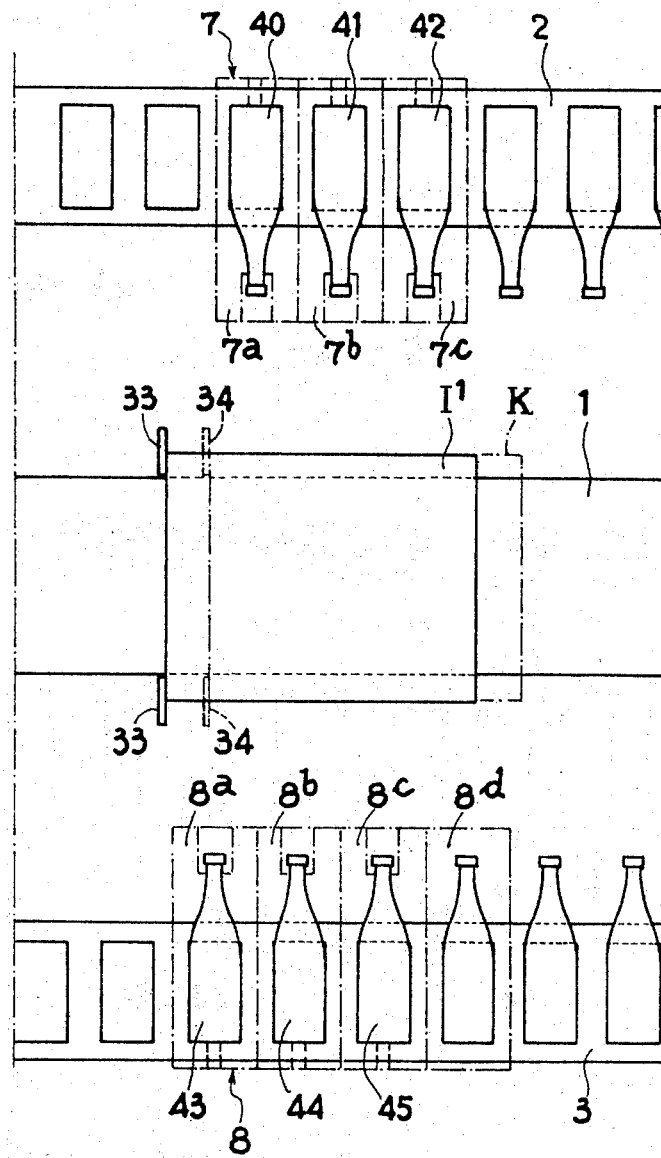
FIG. 7 is an explanatory diagram of the operation of the tray-filling station.

The machine shown in FIGS. 1–4 comprises a tray conveyor 1, two bottle conveyors 2 and 3, a station A for placing empty trays on the conveyor 1, two stations B and C for seizing the bottles from the conveyors 2 and 3, a station D for filling the trays with bottles, and a station E for stacking trays loaded with bottles.

The conveyor 1 is a planar, rectangular and horizontal conveyor operating continuously and adapted to convey the empty trays from the station A to the station D, then the loaded trays from the station D to the station E. The direction of movement of this conveyor is shown by arrow F (FIG. 1) that is to say from A towards D and E.

The station A for placing empty trays on the conveyor 1 has only been shown diagrammatically since it is known to place sheet elements on a conveyor by means of various devices. This station E comprises two devices of this type $A^1$ and $A^2$ which are arranged in succession along the conveyor 1 and deposit successive pairs of trays, the trays of the two devices having different shapes so as to be capable, after having been filled with bottles, of mutual imbrication.

The two bottle conveyors 2 and 3 are disposed on each side of and parallel to the conveyor 1 and moved in the same direction as the latter. These conveyors 2 and 3 carry cradles 4 and 5 for supporting the bottles in a reclining position with their axes disposed transversely of the conveyor. On each conveyor the cradles are spaced apart from each other at a pitch P but the cradles 4 of the conveyor 2 and the cradles 5 of the conveyor 3 are offset from each other at a pitch $p$ equal to P/2. The conveyors 1, 2 and 3 do not move continuously but in a step-by-step manner, the pitch or step of the feed being equal to the pitch P, whereas the conveyor 1 moves continuously.

The conveyors 2 and 3 lead to the bottle-seizing stations B and C which are disposed symmetrically on each side of the filling station D, and these stations B, D and C are surmounted by two guides or rails 6 which are parallel in a common horizontal plane and perpendicular to the three conveyors 1, 2 and 3 and extend beyond the conveyors 2 and 3 to support posts $6^a$. These guides carry two carriages 7 and 8 slidably mounted thereon, the movement of the carriages being controlled by jacks or cylinder devices 9 and 10 connected to the posts $6^a$.

Each of the carriages 7 and 8 carries a number of devices for seizing the reclining bottles, namely three bottles in respect of carriage 7 and four in respect of carriage 8. The seizing devices of each carriage are spaced apart from each other a distance equal to pitch P and those of the carriage 7 are offset to extent of pitch $p$ with respect to those of the carriage 8. As shown in FIG. 2, each device comprises a jack or cylinder device 11 which is disposed parallel to the guides 6 and whose body is pivoted to the carriage by a pin 12 and whose piston rod is pivoted to one of the arms $14^a$ of a double armed lever 14 by a pin 13. The lever 14 is pivoted to the rear of the carriage by a pin $15^a$. The other arm $14^b$ of the lever carries at its end a finger portion 16 which is roughly parallel to the guides 6 for insertion in and seizing the bottom of a bottle. A link 17 is pivoted at one end to the arm $14^b$ and at the other end to one of the arms $18^a$ of another lever 18 which has double arms and is pivoted to the front of the carriage by a pin $15^b$, the other arm $18^b$ of the lever 18 having at its end a cavity or cup 19 adapted to receive the neck of the bottle. The levers 14 and 18 and the link 17 are contained in a common vertical plane parallel to the guides 6.

The station E for stacking the trays loaded with bottles comprises, as shown in FIGS. 3 and 4, a frame 20 from the upper cross-member $20^a$ of which is suspended through a vertical jack or cylinder device 21 a chassis 22 which is slidably guided by ear portions 23 on lateral vertical posts $20^b$ of the frame 20 disposed on each side of the conveyor 1. Slidably mounted on two lateral, horizontal and lower frames $22^a$ of the chassis 22 are two horizontal rows of telescopic finger structures $24^a$ and $24^b$ disposed in facing relation and carried by two horizontal cross-menbers which are parallel to the conveyor 1 and pivoted to two arms $25^a$ and 26 which are pivotably mounted on lateral uprights $22^b$ of the chassis 22. The arm $25^a$ is extended, on the opposite side of its pivot axis, by an arm $25^b$ which is connected by a pivot pin 27 to a jack or cylinder device 28, also pivoted to the upper cross-member $22^c$ of the chassis 22. The arm $25^b$ is also connected to the arm 26 by a link 29.

As shown in FIGS. 5 and 6, the trays are sheets of moulded or press-formed material 30 in which are formed imprints of bottles $30^a$, these imprints being achieved in such manner that the bottles placed therein have a head-to-toe relation and the distance between two imprints arranged in the same direction being equal to the pitch P. Further, the stacking of the trays is such that the bottles are also in head-to-toe relation in the vertical direction, that is to say that above a bottle 31 placed in one direction there is a bottle 32 placed in the other direction. Thus, in order that the packet formed by the stacking of a plurality of trays be regular or even, there must be placed on a tray $I^1$ of the device $A^1$ a tray K of the device $A^2$ which is symmetrical to the preceding tray with respect to the axis of the tray perpendicular to the imprints.

The operation of the machine described hereinbefore is as follows, it being applied to the production of packets of three trays having six bottles per tray.

For reasons of simplicity, there will first be described the operation of the carriage 7 and its bottle-seizing devices. The bottles being placed on the cradles 4 of the conveyor 2, the carriage is placed exactly above this conveyor 2 at station B, the jack 9 being in the withdrawn position. By means of the jacks 11 of the carriage (FIG. 2), the arms $14^b$ are rotated about the pins 15 and these arms introduce their finger structures 16 in the bottom of the bottles placed in the trays located below the various seizing devices, the rotation of the arms $14^b$ also causing a rotation of the arms $18^b$ through the links 17. The cavities 19 of these arms 18 then surround the necks of the bottles which are thus maintained at both ends by the arms $14^b$ and $18^b$. Actuation of the jack 9 causes the carriage 7 to slide along the guides 6 until it reaches the position above the conveyor 1 carrying the trays at the station D. The operation of the carriage 8 and its seizing devices is identical to that of the carriage 7.

The whole of the machine then operates in the following manner:

The conveyors 2 and 3 are fed with bottles by the devices F and G so that the reclining bottles in the cradles 4 and 5 have their necks facing the conveyor 1.

This conveyor 1, which travels forwardly in a continuous manner in the direction of arrow E, brings one tray $I^1$ of the device $A^1$ to the station D for filling the trays. This tray $I^1$ is stopped at station D by withdrawable abutments or stops 33 located on each side of the conveyor downstream of station D. The carriages 7 and 8 are initially placed respectively in position above the conveyors 2 and 3. By operating all the devices $7^a$, $7^b$ and $7^c$ of the carriage 7, three bottles 40, 41 and 42 (FIG. 3) placed at station B are seized by the conveyor 2 and brought by the jack 9 above the tray $I^1$ on which they are placed. The carriage 7 is then returned by the jack 9 to the position above the conveyor 2. The same operation is carried out by the carriage 8 but in operating only the lowermost three of the four seizing devices (with respect to the direction of movement of the conveyor), namely $8^a$, $8^b$ and $8^c$ which then load the bottles 43, 44 and 45. The tray $I^1$ is then loaded with six bottles placed in head-to-toe relation.

The stops 33 are then withdrawn and the tray $I^1$ loaded with bottles is conveyed by the conveyor 1 to the stacking station E.

The following empty tray K which has been placed on the conveyor 1 by the device $A^2$ is conveyed by this conveyor to the filling station D where it is stopped by two other withdrawable stops 34 which are offset a distance equivalent to pitch $p$ from the stops 33 on the input side of the trays.

The conveyor 2 is caused to move forwardly three pitches p so that the first three following bottles on this conveyor replace the bottles 40, 41, 42 which served to load the tray $I^1$. The loading of the tray K by the carriage 7 is recommenced as before. The conveyor 3 is caused to move forwardly two pitches P so that the first two bottles carried by this conveyor replace the bottles 45 and 46 employed for loading the tray $A^1$, that is to say under the seizing devices $8^b$ and $8^c$, whereas the following bottle stops under the last seizing device $8^d$. The tray K is loaded as before by the carriage 8 but by actuating this time only the seizing devices $8^b$, $8^c$ and $8^d$.

The tray K being fully loaded, the stops 34 are withdrawn and the tray is conveyed by the conveyor 1 to the tray stacking station E.

A new tray $I^2$ of the device $A^1$, which is therefore disposed in the same direction as the tray $I^1$, is placed on the conveyor 1 which conveys it to the filling station D where it is stopped by the stops 33. The conveyor 2 is caused to advance three pitches P so that three new bottles replace the three which had served to load the tray K. The loading of the tray $I^2$ by the carriage 7 is started as before.

The conveyor 3 is advanced four pitches or steps so that the following four bottles are placed under the four seizing devices $8^a$, $8^b$, $8^c$ and $8^d$. The tray $I^2$ is then loaded by the carriage 8 by utilizing this time only the three seizing devices $8^a$, $8^b$ and $8^c$, that is to say, the same devices employed when loading the tray $I^1$.

Thus it can be seen that in order to effect one loading cycle of two trays with six bottles, the advance of the conveyor 2 is in succession three pitches, then three pitches and that of the conveyor 3 is in succession two pitches and then four pitches.

The trays are stacked at station E in the following manner:

The chassis 22 is placed in the lower position (extended position of the jack 21) with respect to the frame 20. As the jack 28 is in the withdrawn position, the finger structures $24^a$, $24^b$ are spread apart from each other by the arms $25^a$ and 26 and the link 27. The tray $I^1$ loaded with bottles is conveyed by the conveyor 1 and is stopped by the withdrawable stops 35 located downstream of the stacking station E. Under the action of the jack 28, the finger structures $24^a$ controlled by arms $25^a$ and the finger structures $24^b$ controlled by the arm 26 move toward each other. Under the effect of this movement, the finger structure located in front of the bottoms or kicks of the bottles are blocked by the walls $30^b$ that the tray defines behind each bottom and they bear on these walls in bringing into action their telescopic mechanism. On the other hand, the finger structures located in front of the necks are introduced under the raised portions $30^c$ that the tray has in the extension of each neck. By means of the jack 21 the chassis 22 is raised a distance H which is a little greater than the diameter d of the bottles, this chassis carrying along therewith the finger structures $24^a$ and $24^b$ and the tray $I^1$. The loaded tray K is then conveyed by the conveyor 1 on which it is stopped by the stops 35 at the stacking station. This tray K is then located under the tray $I^1$. By withdrawing the piston of the jack 28, the finger structures $24^a$ and $24^b$ are moved away from each other so that the tray $I^1$ is placed on the tray K. The trays $I^1$ and K are therefore in head-to-toe relation. The chassis 22 is then lowered once again to its lower position by means of the jack 21 so that the finger structures $24^a$ and $24^b$ are at the level of the tray K and the operation for seizing and raising this tray K is recommenced and, at the same time, the tray $I^1$ is raised as before. The tray $I^2$ can then arrive in a position in which it is stopped by the stops 35 under the trays $I^1$ and K. The finger structures $24^a$ and $24^b$ are then moved apart and the packet is completed by the stacking of trays $I^1$, K and $I^2$. This packet can be discharged, for placing it in a case, by withdrawal of the stops 35.

With such a machine it is possible to fill trays with bottles and stack the trays irrespective of the number of objects that is desired to be placed on these trays and irrespective of the number of trays that is desired to be stacked. Owing to the non-synchronized step-by-step advance of the conveyors 2 and 3 and of the different numbers of seizing devices of the carriages 7 and 8, the carriage 7 having three seizing devices and the carriage 8 four, it is indeed possible to load trays having two, three, four, five or six bottles.

The following table indicates the feeds of the conveyors and seizing devices which must be employed for loading different trays. The first column indicates the number of bottles to be placed in each tray; the other columns indicate the seizing devices to be actuated and the forward travel of each conveyor, on one hand, for the different trays I, such as the trays $I^1$ and $I^2$ mentioned above, and, on the other hand, for the different trays K, such as the aforementioned tray K (it is indeed obvious that it is possible to stack any even or odd number of trays, this number being limited merely by the height of the chassis 22).

Further, each tray located on the conveyor 1 is only raised a height H, since, if it is desired to stack a plurality of trays, they are stacked tray by tray and the lowermost tray is employed for raising the stack formed. Consequently, the control of the raising of the stack of trays by the jack 21 is relatively simple and only a single travel is required of this jack.

The control of the various stations and conveyors may be effected hydraulically or electrically. A mechanical, electrical or hydraulic device may be employed for the programming of the various operations so as to permit an automatic operation of the machine, irrespective of the number of bottles contained in each tray and the number of trays to be stacked.

A station for checking or controlling the filling of the trays may be provided between the filling station D and the stacking station E so as to preclude stacking trays which have not been completely loaded.

Having now described my invention what I claim as new and desire to secure by Letters Patent is:

1. A machine for grouping objects of elongate and dissymetrical shape by head-to-toe loading of the objects on trays and then stacking a plurality of loaded trays, said machine comprising a tray filling station, two object-seizing stations, transfer devices movable between the seizing stations and the filling station, object-seizing devices carried by each of the transfer devices, two conveyors for feeding the objects and respectively leading to the two seizing stations and oriented in directions different from the direction of movement of the transfer devices, a tray stacking station, and a tray feeding and transfer conveyor which extends through the filling station in a direction different from the direction of movement of the transfer devices and leads to the tray stacking station.

2. A machine as claimed in claim 1, wherein the transfer devices comprise guides and carriages movable on the guides.

3. A machine as claimed in claim 2, wherein the three conveyors are parallel to each other and the guides are also parallel to each other and perpendicular to the three conveyors.

4. A machine as claimed in claim 1, wherein the conveyors feeding the objects comprise cradles which are spaced equal distances apart at a given pitch, the cradles of one of the conveyors being offset half said pitch from the cradles of the other conveyor.

5. A machine as claimed in claim 4, wherein the seizing devices of a given transfer device are spaced apart a distance equal to said pitch of the cradles of the object feeding conveyors, and the seizing devices of one of the two transfer devices are offset half said pitch from the seizing devices of the other transfer device.

| Number of bottles | Trays I | | | Trays K | | |
|---|---|---|---|---|---|---|
| | Seizing device actuated | Advance of the conveyors in pitches | | Seizing device actuated | Advance of the conveyors in pitches | |
| | | 2 | 3 | | 2 | 3 |
| 2 | $7^a, 8^a$ | 1 | 0 | $7^a, 8^b$ | 1 | 2 |
| 3 | $7^a, 8^a-8^b$ | 1 | 1 | $7^a-7^b, 8^b$ | 2 | 2 |
| 4 | $7^a-7^b, 8^a-8^b$ | 2 | 1 | $7^a-7^b, 8^b-8^c$ | 2 | 3 |
| 5 | $7^a-7^b, 8^a-8^b-8^c$ | 2 | 2 | $7^a-7^b-7^c, 8^b-8^c$ | 3 | 3 |
| 6 | $7^a-7^b-7^c, 8^a-8^b-8^c$ | 3 | 2 | $7^a-7^b-7^c, 8^b-8^c-8^d$ | 3 | 4 |

6. A machine as claimed in claim 1, wherein one of the transfer devices carries one more seizing device than the other transfer device.

7. A machine as claimed in claim 1, wherein each seizing device comprises two arms which are pivotable relative to the corresponding transfer device, a jack operatively connected to the two arms for shifting the two arms, a finger portion carried at an end of one of the arms and a cavity provided at an end of the other of the arms.

8. A machine as claimed in claim 1, wherein the tray stacking station comprises a vertically movable chassis, a jack for vertically moving the chassis, horizontal telescopic finger structures slidable with respect to the chassis, and means for controlling the finger structures and comprising arms pivotable relative to the chassis and operatively connected to the finger structures and a jack for shifting the arms.

9. A machine as claimed in claim 8, wherein the jack for vertically moving the chassis has a constant travel.

* * * * *